United States Patent [19]
Ohta

[11] Patent Number: 5,683,153
[45] Date of Patent: Nov. 4, 1997

[54] CONTAINER FOR ACCOMMODATING DISCS

[75] Inventor: Mineko Ohta, Osaka, Japan

[73] Assignee: Elecom Kabushiki Kaisha, Osaka-fu, Japan

[21] Appl. No.: 637,950

[22] Filed: Apr. 25, 1996

[30] Foreign Application Priority Data

May 12, 1995 [JP] Japan .................................. 7-114704

[51] Int. Cl.$^6$ .............................. B65D 85/57; A47F 1/04
[52] U.S. Cl. .............................. 312/9.1; 211/40; 312/9.32
[58] Field of Search ................................ 211/40; 312/9.1, 312/9.9, 9.32, 9.47, 9.46, 9.54, 348.3, 348.5, 9.21, 9.53

[56] References Cited

U.S. PATENT DOCUMENTS

| | | | |
|---|---|---|---|
| 3,100,671 | 8/1963 | Atkins | 312/9.58 |
| 3,753,606 | 8/1973 | Ozeki | 312/9.58 X |
| 3,812,975 | 5/1974 | Gutierrez | 211/40 |
| 4,236,768 | 12/1980 | Morrone | 211/40 X |
| 4,330,161 | 5/1982 | Khawand | 312/9.58 X |
| 4,339,162 | 7/1982 | Gelardi et al. | 312/9.21 |
| 4,763,962 | 8/1988 | Ackeret | 312/9.32 |
| 4,875,743 | 10/1989 | Gelardi et al. | 211/40 X |
| 4,932,522 | 6/1990 | Milovich | 211/40 X |
| 5,097,946 | 3/1992 | Emrich | 211/40 X |
| 5,238,112 | 8/1993 | Massey et al. | 312/9.53 X |
| 5,515,979 | 5/1996 | Salvail | 211/40 |

Primary Examiner—Peter M. Cuomo
Assistant Examiner—Robert J. Sandy
Attorney, Agent, or Firm—Jordan and Hamburg

[57] ABSTRACT

A disc container includes: a casing having an opening; a plurality of disc holders arranged in a specified direction, each disc holder being formed with a disc holding portion for removably holding a disc and a pivot member at a depth portion thereof; and a plurality of guide passages provided on the casing and extending in a depthwise direction of the casing for allowing the pivot member to be slid from a first position where the disc holder is entirely accommodated in the casing to a second position where the disc holder is projected from the casing and is rotatable about the pivot member, and vice versa.

16 Claims, 6 Drawing Sheets

CONTAINER FOR ACCOMMODATING DISCS

BACKGROUND OF THE INVENTION

The present invention relates to a container for accommodating a number of discs as recorded medium, such as compact disc (CD) and laser disc (LD).

Conventionally, there has been known a container for accommodating a number of discs therein. The container includes a number of disc holders in the form of a plate each having a disc holding member, e.g., a projection fittable in a center hole of a disc when the disc is mounted on the holder. The disc holders are freely withdrawable through an opening formed in a front portion of a casing of the container. Also, the disc holders are selectively brought into an accommodated state of being placed in the container and into a projected state of being withdrawn from the container. Discs can be taken out from or accommodated in the container. Each disc holder is pivotally moved in an arrangement in which a shaft is transversely provided in a lower front end of the respective disc holders.

However, this arrangement has suffered the following drawbacks. The disc holder is moved on a vertical plane perpendicularly intersecting a width of the casing, and is fixedly positioned in front of the casing along the vertical plane to dismount or mount a disc from or on the disc holder. Accordingly:

a) The title of a disc must be read along a depthwise direction. A user has to identify the title of a disc from either the left or right side of the disc holder on which the disc is mounted. Particularly, in the case where the disc holder carries two discs on both sides thereof, the user has to do this identifying operation twice, i.e., from both sides of the disc holder mounting the discs;

b) When adjacent disc holders each carrying discs on the both sides thereof are withdrawn at the same time, it is difficult or impossible to identify the title of discs placed respective inside portions of the adjacent disc holders because the inside-positioned disc of one disc holder is blocked from being seen by discs carried by the other disc holder. For this reason, it is necessary to withdraw disc holders one by one to identify the title of disc.

c) The disc holder is fixedly positioned along the depthwise direction of the casing. This requires the dismounting or mounting of a disc only in sidewise directions.

In the conventional disc container, as mentioned above, the search for disc and the mounting and dismounting of disc have been cumbersome and need a long time.

SUMMARY OF THE INVENTION

It is an object of the present invention to provide a disc container which has overcome the drawbacks residing in the prior art.

It is another object of the present invention to provide a disc container which enables easier dismounting and mounting of disc and easier disc search.

The present invention is directed to a disc container comprising: a casing having an opening; a plurality of disc holders arranged in a specified direction, each disc holder being formed with a disc holding portion for removably holding a disc and a pivot member at a depth portion thereof; and a plurality of guide passages provided on the casing and extending in a depth-wise direction of the casing for allowing the pivot member to be slid from a first position where the disc holder is entirely accomodated in the casing to a second position where the disc holder is projected from the casing and is rotatable about the pivot member, and vice versa.

The disc holder may be provided with a restrictor slidable in the guide passage and operable to be out of the guide passage when the disc holder is in the second position.

Also, the disc holder may be formed with a disc holding portion on each side thereof.

Further, the casing may be provided with a stopper for keeping the disc holder from sliding in the first position.

With thus constructed disc container, in the second position where the disc holder is projected from the casing, the disc holder is rotatable about the pivot member. Accordingly, the disc holder can be swung in a direction of seeing the title of disc easily or in a direction of mounting or dismounting a disc on or from the disc holder. Also, a disc can be mounted on and dismounted from a disc holder in the state that a plurality of disc holders are withdrawn at the same time. Further, a disc can be searched one after another quickly like turning over pages of a book.

Comparing to the conventional disc container in which the disc holder is fixedly placed along an extension of the sliding movement, accordingly, discs can be mounted and dismounted or searched more easily and efficiently. In particular, this inventive construction is advantageous in the case of holding discs on the both sides of a disc holder.

Further, the disc holder is provided with the restrictor slidable in the guide passage and operable to be out of the guide passage when the disc holder is in the second position. Accordingly, the disc holder can be reliably kept from swinging during the sliding. This will assure smooth sliding of the disc holder and prevent adjacent disc holders or discs from hitting each other.

Further, the disc holder is formed with a disc holding portion on each side thereof. Accordingly, the number of discs to be accommodated in the container can be increased to twice as large as the number of disc holders.

Further, the casing is provided with a stopper for keeping the disc holder from sliding in the first position. This will reliably prevent disc holders from sliding inadvertently even when the container is inclined during transportation.

These and other objects, features and advantages of the present invention will become more apparent upon a reading of the following detailed description and accompanying drawings.

DETAILED DESCRIPTION OF THE PREFERRED EMBODIMENTS OF THE INVENTION

A disc container embodying the present invention will be described with reference to the accompanying drawings.

Figure 2:
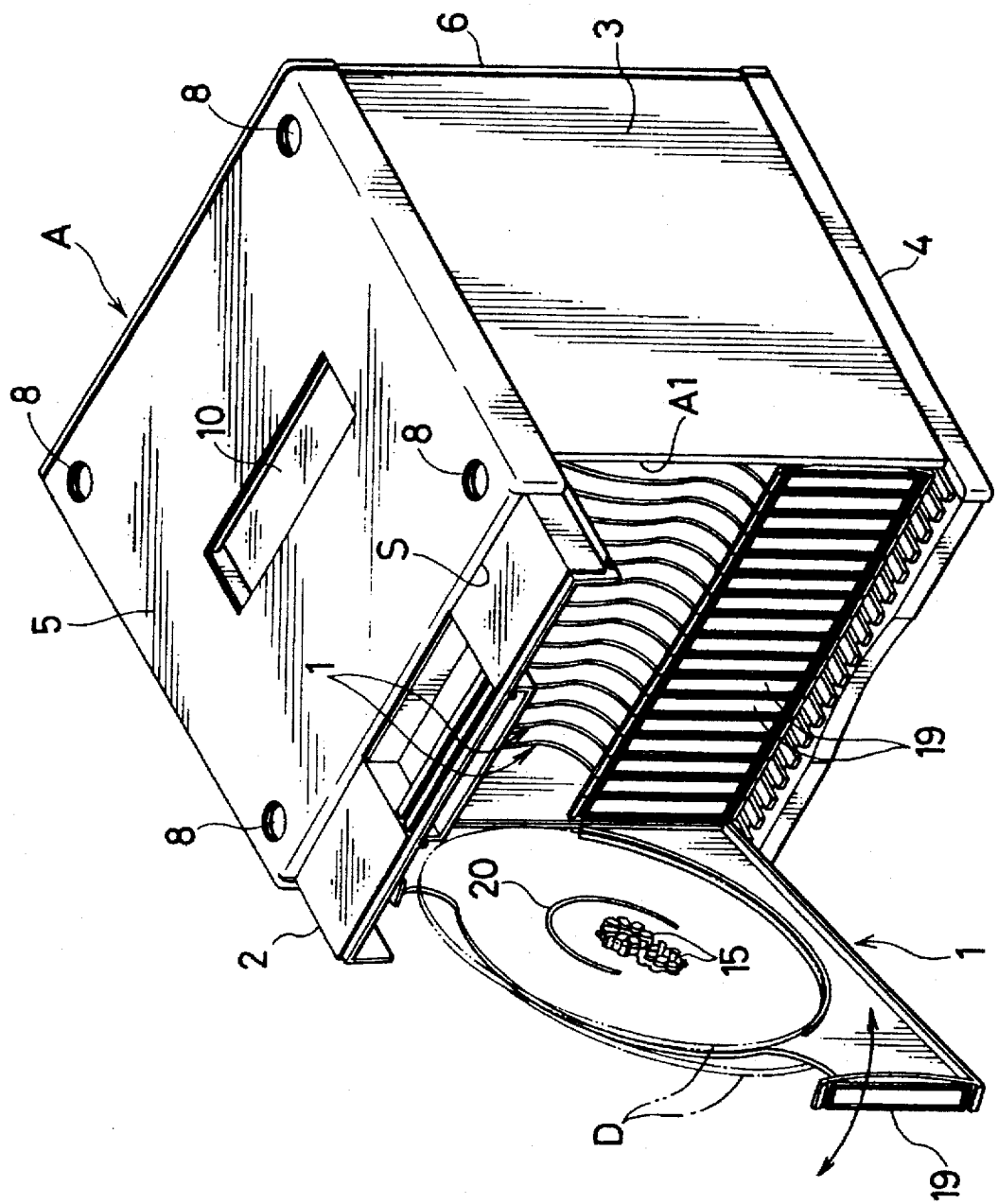
FIG. 2 is a perspective view of the disc container in an opened state, one of the disc holders being withdrawn.

In FIG. 2, indicated at A is a casing having an opening A1 in a front portion thereof. Indicated at 1 are a number of disc holders which are arranged in parallel with one another in a widthwise direction of the casing A at an interval. Indicated at 2 is a front door member which opens and closes the opening A1 to thereby selectively bring the disc container into a closed state and an opened state.

The casing A is constructed by side walls 3, 3, a bottom wall 4, an outer top wall 5, and a rear wall 6, and has the shape of a box.

The casing A is further provided with an inner top wall 7 provided below and in parallel with the outer top wall 5. The inner top wall 7 is spaced from the outer top wall 5 so as to provide an accommodation space S for accommodating the front door member 2 therebetween. By withdrawing and inserting the front door member 2 from and into the accommodation space S, the opening A1 is opened and closed.

Figure 3:
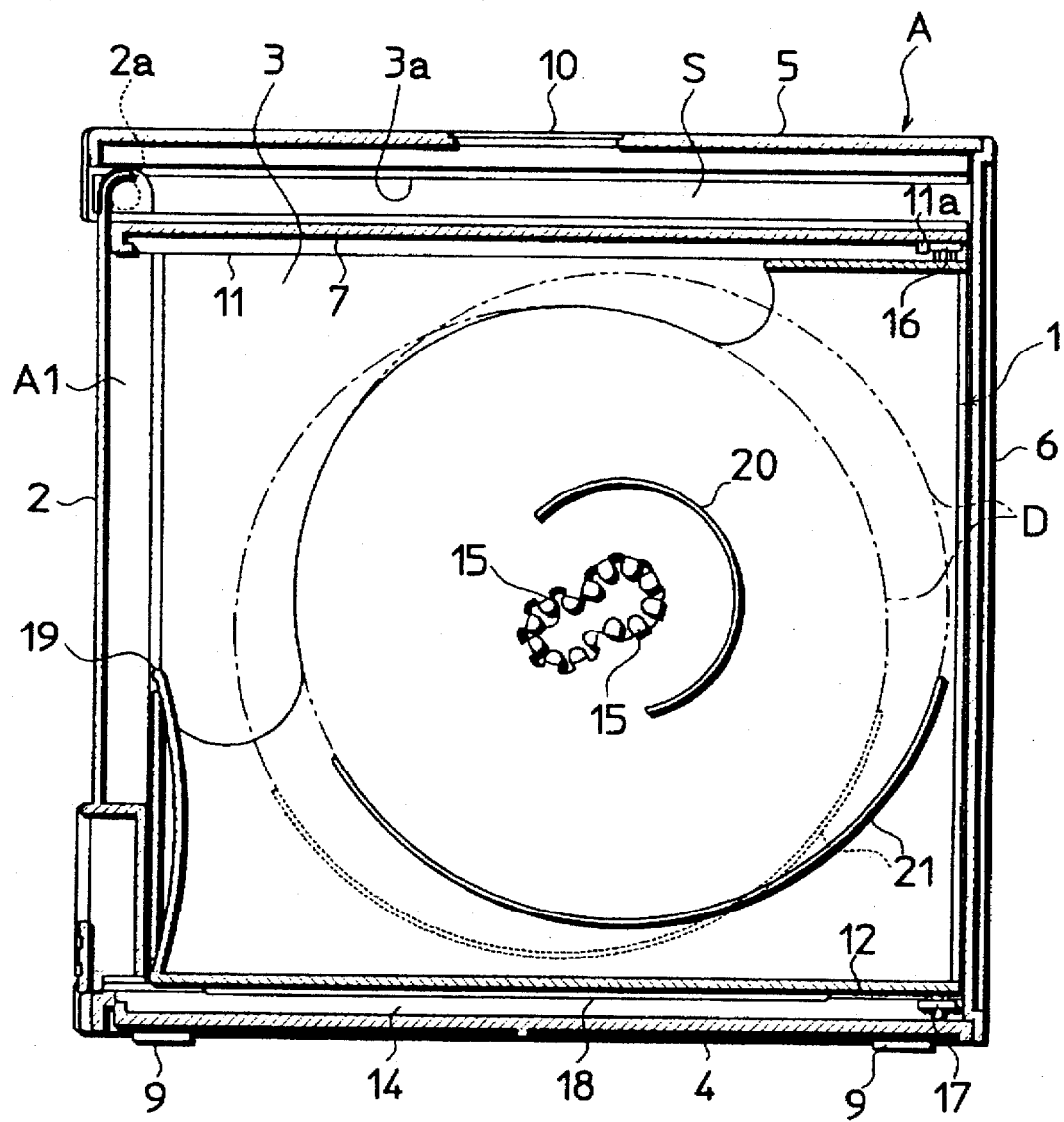
FIG. 3 is a vertical sectional view of the disc container in the closed state.

The front door member 2 is provided with slide pins 2a, 2a at respective upper ends of right and left sides thereof. In FIG. 3, however, only the right slide pin 2a is shown. Each side wall 3 is internally formed with a slide groove 3a in an upper portion thereof. The slide groove 3a extends in a depthwise direction substantially over the depth of the casing A. The slide pins 2a, 2a are slidable in the slide grooves 3a.

Figure 1:
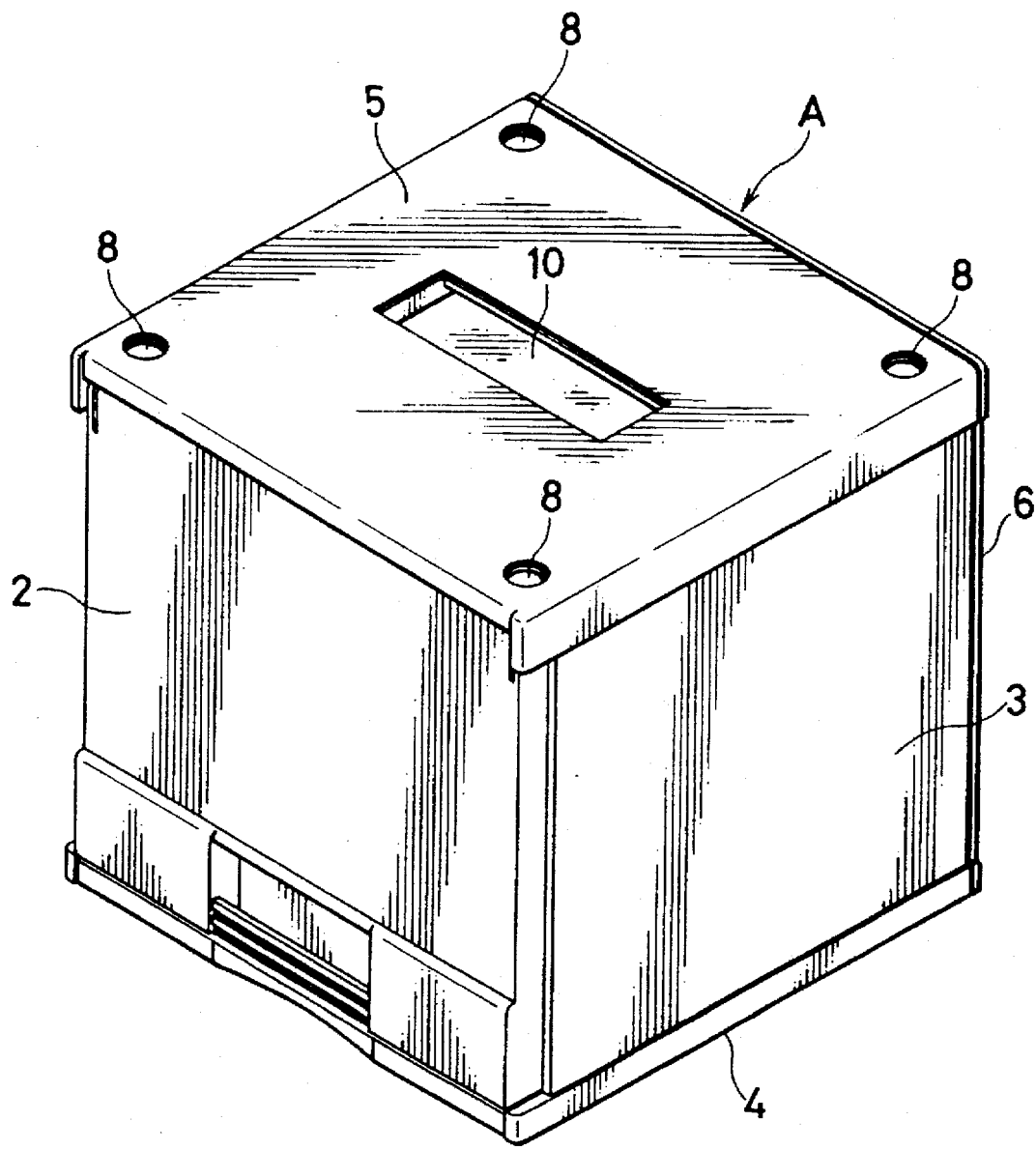
FIG. 1 is a perspective view of a disc container according to the present invention, the disc container being in a closed.
Figure 4:
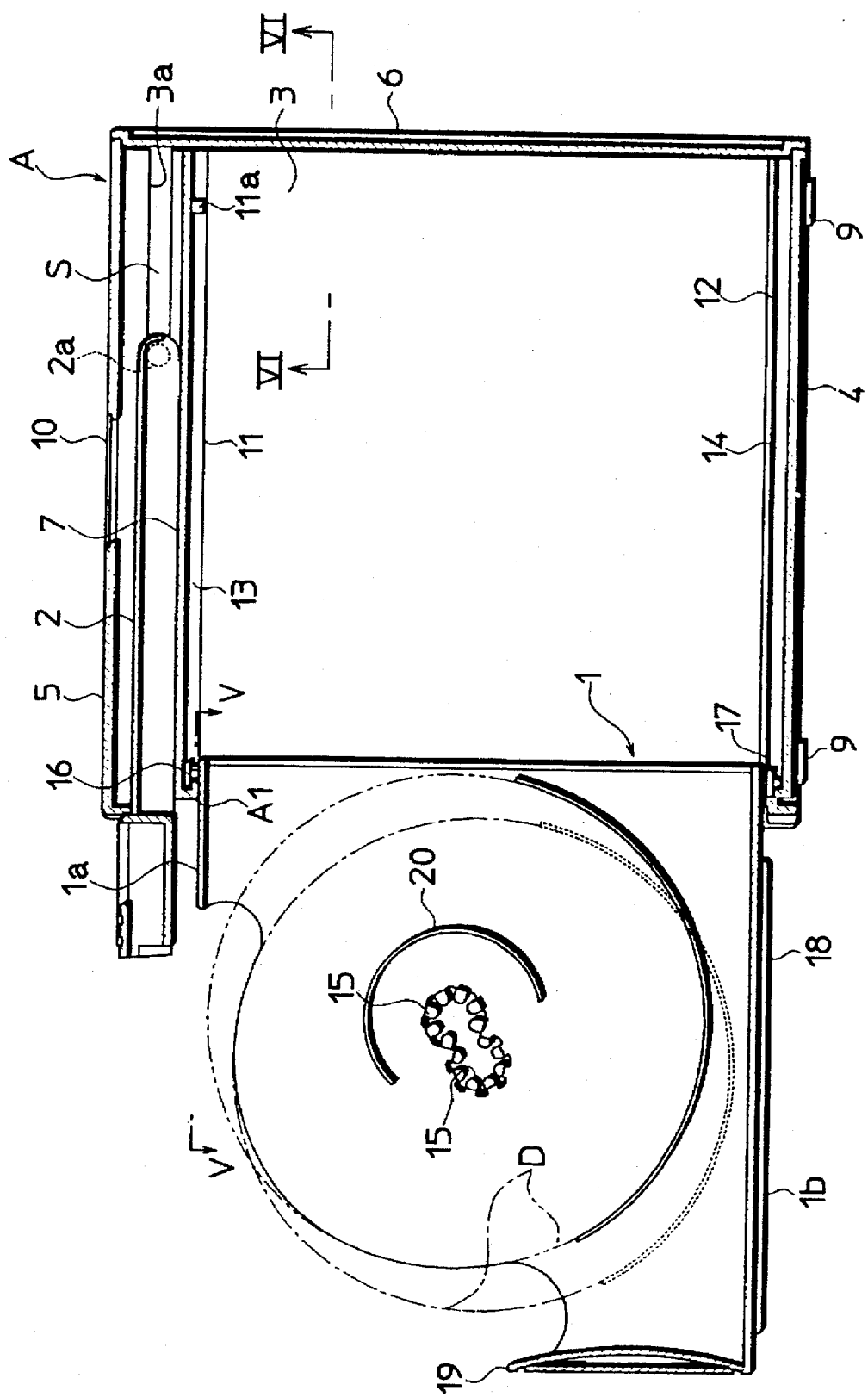
FIG. 4 is a vertical sectional view of the disc container in the opened state.
Figure 5:
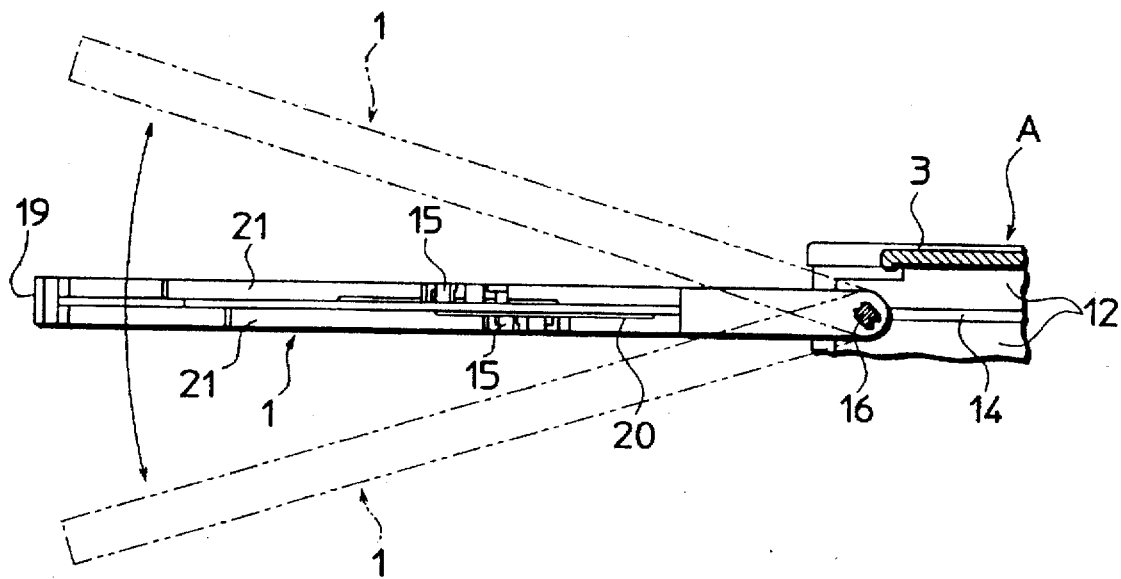
FIG. 5 is a sectional view taken along the line V—V in FIG. 4.
Figure 6:
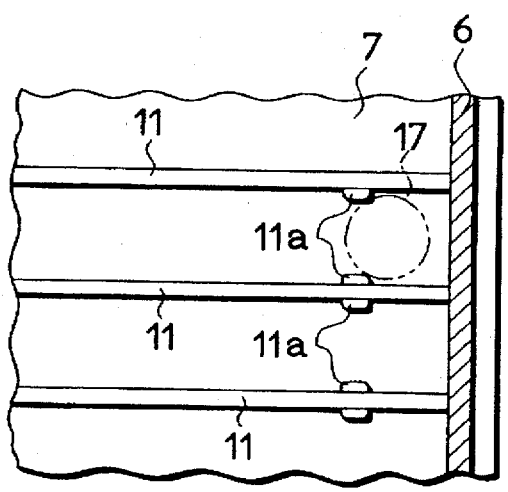
FIG. 6 is a partial sectional view taken along the line VI—VI in FIG. 4.
Figure 7:
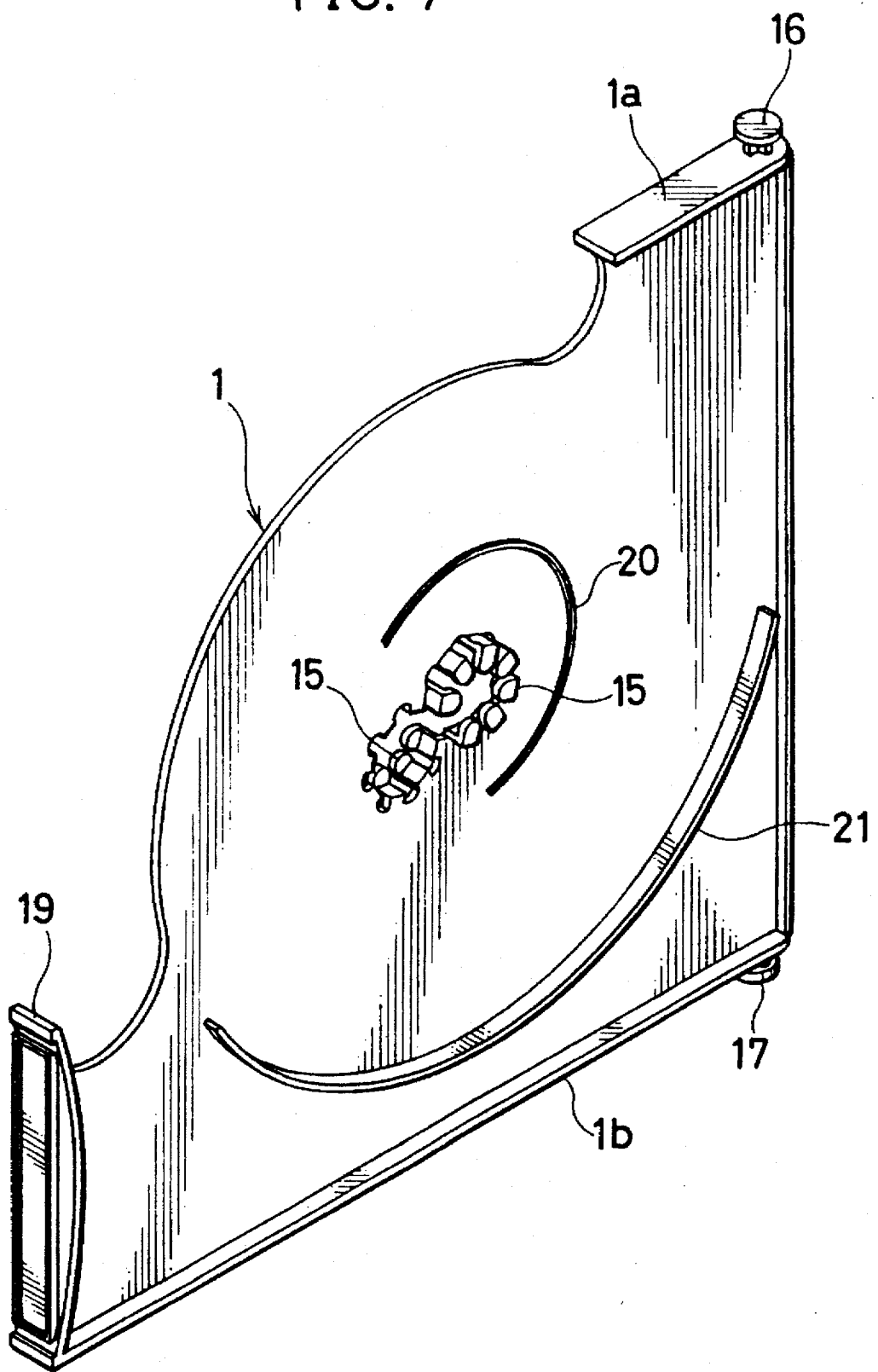
FIG. 7 is an enlarged perspective view of the disc holder.

When the slide pins 2a, 2a are positioned at front ends of the slide grooves 3a, 3a, the front door member 2 is selectively rotated about the slide pins 2a, 2a into a horizontal posture shown in FIGS. 2 and 4 or into a vertical posture shown in FIGS. 1 and 3.

The front door member 2 is inserted in the accommodation space S by sliding the slide pins 2a, 2a in the slide grooves 3a, 3a rearward in the horizontal posture to open the opening A1 of the disc container. Also, the front door member 2 is withdrawn from the accommodation space S by sliding the slide pins 2a, 2a in the slide grooves 3a, 3a forward to close the opening A1 of the disc container.

As shown in FIGS. 1 and 2, the outer top wall 5 is formed with connecting recesses 8 in corners thereof. The connecting recess 8 has a circular shape. On the other hand, as shown in FIGS. 3 and 4, the bottom wall 4 is formed with connecting projections 9 at corners thereof corresponding to the connecting recesses 8. Accordingly, in the case where a plurality of containers are stacked one over another vertically, the connecting projections 9 of one container are fitted in the connecting recesses 8 of another container. Thus, the plurality of containers are stably stacked one over another.

Indicated at 10 is a gripping hole in the form of a rectangle. The gripping hole 10 is formed in a center of the outer top wall 5. The gripping hole 10 is adapted for carrying the disc container with hand.

The inner top wall 7 is formed with a specified number of guide ribs 11 on an underside surface thereof. The bottom wall 4 is formed with a specified number of guide rails 12 on a top surface thereof. Each guide rail has a T-shape in cross section. The number of guide ribs 11 extend substantially over the depth of the casing A and are arranged in the widthwise direction of the casing A in parallel with one another at an equal interval. Likewise, the number of guide rails 12 extend substantially over the depth of the casing A and are arranged in the widthwise direction of the casing A in parallel with one another at an equal interval. In this way, upper guide passages 13 are defined between the respective adjacent guide ribs 11. Also, lower guide passages 14 are defined between the respective adjacent guide rails 12. The number of upper and lower guide passages 13, 14 are identical to the number of disc holders 1. Each disc holder 1 is slidably placed in the corresponding upper and lower guide passage 13 and 14.

The disc holder 1 is generally formed into a plate-like shape. An outer periphery of the disc holder 1 is partially formed into a circular arc. The disc holder 1 is formed with a center holding boss 15 at a center on right and left side surfaces thereof. The center holding boss 15 is defined by a number of bent finger-like projections arranged along a circle.

A disc D is held on the disc holder 1 by fitting a center hole D1 of the disc D on the center holding boss 15. In the state that the disc D is held on the disc holder 1, a part of the disc D projects out from the arc portion of the disc holder 1.

The center holding bosses 15 formed on the left and right sides are slightly shifted in a radial direction from each other to ensure easy molding process. Also, this arrangement is advantageous in mounting and dismounting of discs D on and from the disc holder 1 from the both sides thereof because discs D are held eccentrically from each other on the center holding bosses 15, as shown in FIGS. 2 to 6.

The disc holder 1 is further formed with an upper flange 1a on an upper end edge thereof and a lower flange 1b on a lower end edge thereof, respectively. The lower flange 1b extends substantially over the depth of the disc holder 1. The upper flange 1a and the lower flange 1b are arranged in parallel with each other in the depthwise direction of the casing A, i.e., in the sliding direction of the disc holder 1. The upper flange 1a is provided with an upper pivot stem 16 at a rear end thereof, whereas the lower flange 1b is provided with a lower pivot stem 17 at a rear end thereof. The upper and lower pivot stems 16 and 17 are arranged along in the same vertical line.

The upper and lower pivot stems 16 and 17 are each formed with a disc-shaped flange. The upper pivot stem 16 is slidably placed in an upper guide passage 13, whereas the lower pivot stem 17 is slidably placed in the lower guide passage 14. corresponding to the upper guide passage 13. Accordingly, the disc holder 1 is pivotally rotatable about the upper and lower pivot stems 16 and 17.

With this arrangement, the disc holder 1 is slid in the rearward direction of the casing A to thereby come into an accommodated state shown in FIG. 3 where the disc holder 1 is placed inside the casing A. Alternatively, the disc holder 1 is slid in the forward direction of the casing A to thereby come into a projected state shown in FIGS. 2, 4, and 5 where the disc holder 1 is projected out from the casing A. In the projected state, the disc holder 1 is pivotally rotatable. In other words, the disc holder 1 is swung or rotated in widthwise directions of the casing A about the upper and lower pivot stems 16 and 17.

The lower flange 1b is further provided with a guide rib 18 on an underside surface except the rear end. The guide rib 18 extends in the sliding direction of the disc holder 1 and projects vertically downward by a specified height. The guide rib 18 is set in such a length that the guide rib 18 keeps to be in the lower guide passage 14 until the disc holder 1 comes into the projected state and goes out from the lower guide passage 14 when the disc holder 1 comes into the projected state.

During the time when the guide rib 18 is in the lower guide passage 14, the guide rib 18 serves as a restrictor for preventing the disc holder 1 from swinging about the upper and lower pivot stems 16 and 17. On the other hand, when the disc holder 1 is withdrawn to the projected state, the guide rib 18 goes out of the lower guide passage 14, thereby allowing the disc holder 1 to be swung about the upper and lower pivot stems 16 and 17.

Further, curved projections 11a are formed at both sides of an end portion of each guide rib 11 so that a projection 11a of one guide rib 11 and a projection 11a of adjacent guide rib 11 define a stopper gate for stopping the sliding movement of the disc holder 1. Specifically, the space between the facing projections 11a is made to be slightly smaller than the diameter of the flange of the upper pivot stem 16 so that the upper pivot stem 16 cannot pass the stopper gate without a specified force. When the disc holder 1 is placed in the accommodated state, the upper pivot stem 16 is behind the stopper gate defined by the projections 11a. The disc holder 1 cannot slide forward without a specified pulling force. Accordingly, even when the disc container is inclined forward, the disc holders 1 are kept from sliding out from the container inadvertently.

The disc holder 1 is further formed with a handling portion 19 at a front thereof. The handling portion 19 makes it easy to insert and withdraw each disc holder 1 in and from the casing A to bring it in the accommodated state and the projected state.

Further, the disc holder 1 is formed with a spacer 20 around the center holding boss 15 on each side surface thereof. The spacer 20 is in the form of a section of a ring in concentric with the center holding boss 15, and is adapted for keeping a space between a disc D and the side surface of the disc holder 1 to prevent the disc D from coming into contact with the side surface of the disc holder 1. Accordingly, the surface of disc is not likely to be damaged by the disc holder 1.

Furthermore, the disc holder 1 is formed with a circular support member 21 in a lower portion on each side thereof. The circular support member 21 is concentric with the center holding boss 15, and is adapted for supporting a bottom of a disc D to assure a stable upright posture.

According to a disc container of this invention, a large number of discs D, twice as large as the number of disc holders 1, can be accommodated side by side in the standing posture by mounting two discs on the right and left sides of one disc holder 1.

A disc D can be mounted on and dismounted from the disc holder 1 or searched in the state that one or more disc holders 1 are withdrawn. Specifically, in the projected state, the disc holder 1 is rotatable about the upper and lower pivot stems 16, 17 in widthwise directions of the casing A. Accordingly, the disc holder 1 can be variably positioned in a desired direction along which it is easier to identify the title of disc D or to mount and dismount the disc D on and from the disc holder 1. Further, disc search can be executed rapidly because a plurality of disc holders 1 are withdrawn at the same time and are rotated over one after another quickly like turning over pages of a book.

Further, the disc holder 1 is kept from swinging during the time when the guide rib 18 is in the lower guide passage 14. Accordingly, there is no likelihood that the disc holder 1 undesirably swings even when the disc holder 1 is partially withdrawn. Further, the disc holder 1 is kept from swinging in the accommodated state. Accordingly, adjacent disc holders 1 or discs D are prevented from hitting each other, thereby reliably eliminating the likelihood that a disc D recorded with data is damaged by an adjacent disc holder 1 or disc D.

The present invention is not limited to the foregoing embodiment, but may be applicable to the following various modifications.

a) The foregoing embodiment uses disc holders 1 operable to hold two discs D on right and left sides thereof. However, it may be appreciated to use disc holder operable to hold one disc D on only either right or left side thereof.

b) It may be appreciated to form a disc holding recess in agreement with a disc D in a center of a disc holder 1 in place of the center holding boss 15. A disc D is fittingly placed in the holding recess.

c) In the foregoing embodiment, disc holders 1 are slid in an upright posture in depthwise directions of the casing A through the opening A1 formed in the front portion thereof. However, the arrangement of disc holders is not limited to the above. It may be appreciated to adopt an arrangement of allowing disc holders to slide in a horizontal posture in depthwise directions of a casing. Alternatively, it may be appreciated to adopt an arrangement of allowing disc holders to slide in an upright posture in vertical directions of a casing through an opening formed in a top portion thereof.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A disc container comprising:
   a casing having an opening:
   a plurality of disc holders mounted on said casing for movement between a first position where the disc holders are accommodated in said casing and a second position where the disc holders are withdrawn from said casing;
   each of said disc holders including two opposed sides, first disc supporting means on one side, second disc supporting means on the opposite side;
   said first and second disc supporting means being eccentrically disposed to thereby support two eccentrically disposed discs on said two opposed sides of the disc holder.

2. A disc container according to claim 1 wherein said first and second disc supporting means comprise holding projections adapted to engage and hold a central opening in each disc.

3. A disc container according to claim 1 wherein said first and second disc supporting means comprise outer supports for supporting the outer circumferential edge of the discs on the disc holder.

4. A disc container according to claim 3 wherein said first and second disc supporting means further comprise holding projections adapted to engage and hold a central opening in each disc, said outer supports having a generally partial circular configuration which is concentric with the respective holding projection.

5. A disc container according to claim 1 wherein said two opposed sides of said disc holders are generally flat surfaces, and further comprising spacers projecting from said flat surfaces to prevent the discs from contacting said flat surfaces.

6. A disc container according to claims 5 wherein each of said spacers have a generally circular configuration which are concentric with the respective first and second disc holder means on each side of said disc holder.

7. A disc container according to claim 1 further comprising pivotal means pivotally supporting each of said disc holders on said casing for pivotable movement relative to said casing when said disc holder is in said second position, said disc holder including first guide means, said casing including second guide means, said first and second guide means engaging one another to preclude pivotal movement of said disc holder relative to said casing as said disc holder is being moved from said first position toward said second position.

8. A disc container according to claim 1 further comprising first stopper means on each of said disc holders and second stopper means on said casing, said first and second stopper means having an engageable position in which the first and second stopper means are engaged with one another and a disengaged position in which said first and second stopper means are disengaged from each other, said first and second stopper means being in said engaged position when said disc holder in said first position and being in said disengaged position when said disc holder is in said second position, said engaged first and second stopper means being operable to retain said disc holder in said first position.

9. A disc container according to claim 8 wherein a pulling force is required to move said disc holder from said first position in which said first and second stopper means are in said engaged position.

10. A disc container according to claim 8 wherein said first and second stopper means are operable to require a pulling force in order to move said disc holder from said first position in which said first and second stopper means are in said engaged position to said second position in which said first and second stopper means are in said disengaged position.

11. A disc holder for holding discs comprising a generally flat structure having opposed sides, first disc supporting means on one of said sides, second disc supporting means on the opposed side, said first and second disc supporting means being non-axially aligned to thereby hold two non-axially aligned discs on said opposed sides of the disc holder while precluding relative movement between said non-axially aligned discs and said first and second disc supporting means.

12. A disc container comprising:

a casing having an opening;

a plurality of disc holders mounted on said casing for movement between a first position where the disc holders are accommodated in said casing and a second position where the disc holders are withdrawn from said casing;

each of said disc holders including two opposed sides with first disc supporting means being provided on one side and second disc supporting means being provided on the opposed side;

said first and second disc supporting means each comprise partial circular supports for supporting the circumferential bottom edge portion of each disc, said partial circular supports each having a front end which is disposed at a lower elevation than the center of the respective partial circular support.

13. A disc container according to claim 12 wherein the centers of said partial circular supports on said opposed sides of said disc holder are non-axially disposed.

14. A disc holder for holding discs comprising a generally flat structure having opposed sides, first disc supporting means on one of said sides, second disc supporting means on the opposed side, said first and second disc supporting means comprising holding projections adapted to engage and hold a central opening in each disc, said first and second disc supporting means being non-axially aligned to thereby hold two non-axially aligned discs on said opposed sides of the disc holder.

15. A disc holder for holding discs comprising a generally flat structure having opposed sides, first disc supporting means on one of said sides, second disc supporting means on the opposed side, said first and second disc supporting means comprising outer supports for supporting the outer circumferential edge of the discs on the disc holder, said first and second disc supporting means being non-axially aligned to thereby hold two non-axially aligned discs on said opposed sides of the disc holder.

16. A disc container according to claim 15 wherein said first and second disc supporting means further comprise holding projections adapted to engage and hold a central opening in each disc, said outer supports having a generally partial circular configuration which is concentric with the respective holding projections on each side of said disc holder.

* * * * *